July 30, 1957 P. J. H. JANSSEN 2,801,280

SYNCHRONIZING SIGNAL SEPARATOR AND AUTOMATIC GAIN CONTROL

Filed Dec. 1, 1953

INVENTOR

PETER JOHANNES HUBERTUS JANSSEN

BY Fred M Vogel

AGENT 2,801,280

SYNCHRONIZING SIGNAL SEPARATOR AND AUTOMATIC GAIN CONTROL

Peter Johannes Hubertus Janssen, Eindhoven, Netherlands, assignor, by mesne assignments, to North American Philips Company, Inc., New York, N. Y., a corporation of Delaware Application December 1, 1953, Serial No. 395,533

Claims priority, application Netherlands December 1, 1952

4 Claims. (Cl. 178—7.3)

Figures 1, 2A, 2B, 2C, 3, 4, 5:
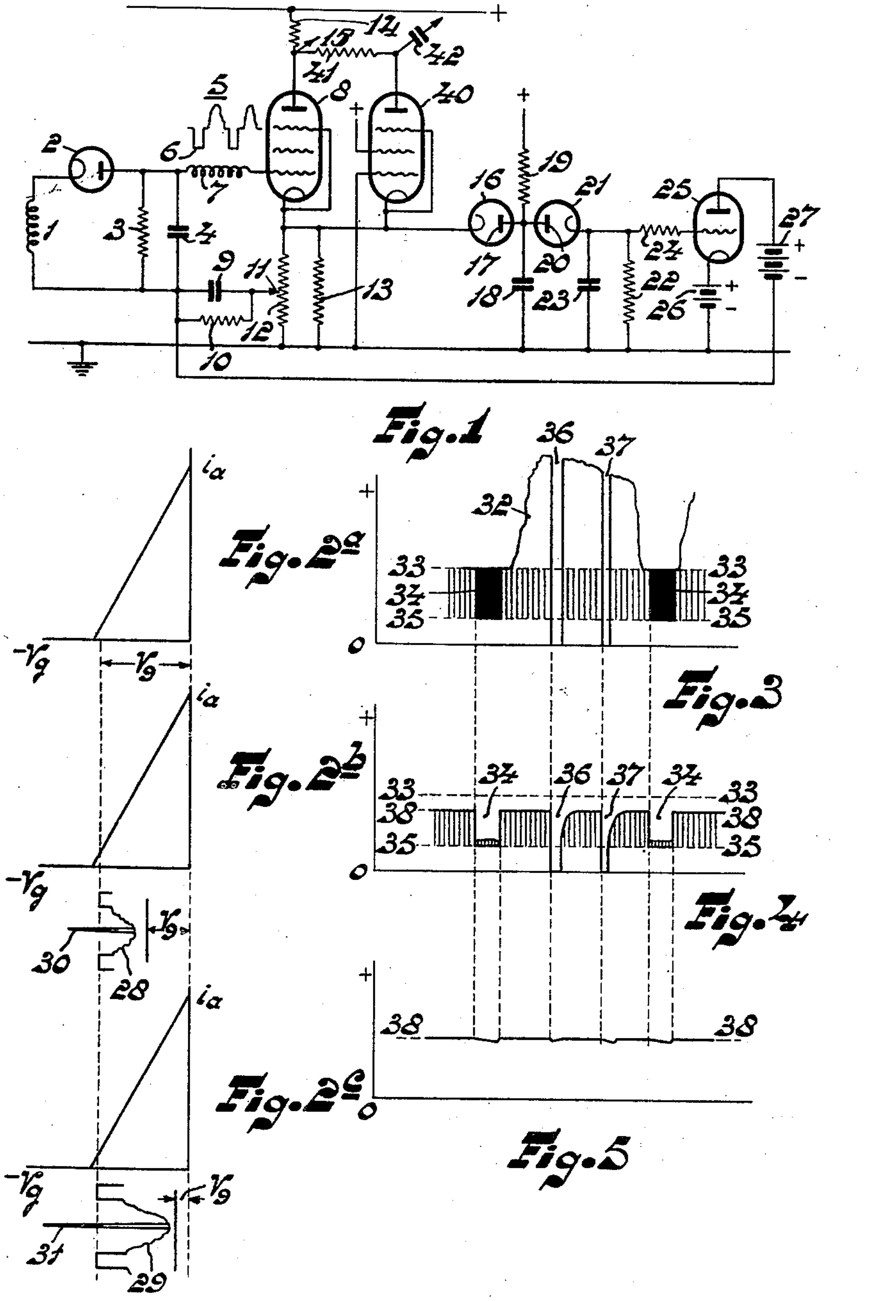

The invention relates to a circuit arrangement for use in a television receiver for television signals modulated in a negative sense on a carrier wave, the modulated signal being supplied, with negative polarity of the synchronizing pulses, to a control-grid of a discharge tube, the voltage occurring across the output circuit of the tube being supplied via a rectifier to a network comprising a capacitor and a resistor, the capacitor being charged via this resistor at a polarity contributing to the conductivity of the rectifier, a bias voltage for the control-grid of the tube being derived from this network via a supply conductor, the peaks of the synchronizing pulses being kept on a substantially constant level substantially corresponding to the minimum anode current of the tube by means of this bias voltage.

Since in such circuits, already suggested before, independently of the intensity variations of the incoming signals the peaks of the synchronizing pulses coincide with the cutting-off point of the grid-voltage anode-current characteristic curve of the tube, interference pulses can be limited substantially to the peak value of the synchronizing pulses.

In practice it has, however, been found that if interference pulses occur frequently and for a long time, the level of the peaks of the synchronising pulses nevertheless shifts in place. The invention has for its object to provide a circuit arrangement in which even under bad conditions of reception the level of the peaks of the synchronising pulses substantially does not shift.

The circuit according to the invention has the feature that the supply circuit includes a second rectifier, connected in a sense opposite the first rectifier, the voltage derived from the network being fed via this second rectifier to an integrating network, the time constant of which is great relative to the time constant of the first network.

In order that the invention may be readily carried into effect, it will now be described with reference to the accompanying drawing, in which Fig. 1 shows part of the circuit of a television receiver, in which one embodiment of the circuit according to the invention is used; the operation of the circuit shown in Fig. 1 is explained more fully with reference to the Figs. 2*a*, 2*b*, 2*c*, Fig. 3, Fig. 4 and Fig. 5.

In the circuit shown in Fig. 1 the high-frequency or intermediate-frequency television signal across the coil 1 is demodulated by means of the diode 2 and the parallel combination of a resistor 3 and a capacitor 4. The signal across this parallel combination, having the waveform shown at 5, the synchronising pulses 6 being at negative polarity, is supplied through the coil 7 to the control-grid of the tube 8. The lower end of the parallel combination 3, 4 is connected through the capacitor 9, with which the resistor 10 is connected in parallel, to an adjustable tapping 11 of the resistor 12, which is included in the cathode lead of the tube 8. A resistor 13 is connected in parallel with the resistor 12. The resistor 14, from which the amplified signal is derived at 15, is connected between the anode of tube 8 and the positive terminal of the anode supply of about 200 v., the negative terminal of which is connected to earth.

The cathode of the tube 8 is connected to the cathode of the diode 16. The capacitor 18 is connected between the anode 17 of this diode and earth and the anode 17 is connected through a resistor 19 to a point of positive potential of for example 12 v. The anode 17 is, moreover, connected to the anode 20 of a diode 21 and the parallel combination of the resistor 22 and the capacitor 23 is connected between the cathode of this diode 21 and earth. The voltage across this parallel combination is supplied through the resistor 24 to the control-grid of the tube 25. The cathode lead of this tube includes a source 26 of bias voltage (shown only diagrammatically), with the aid of which a positive bias voltage is supplied to the cathode of the tube 25.

For the sake of completeness it should be noted that for clearness' sake a few supply sources of the circuit are represented diagrammatically by batteries. In a television receiver these voltage sources may usually be avoided, since various voltages may be derived from other circuits in the receiver in a simple manner.

If the diode 21, the resistor 22 and the capacitor 23 are provisionally left out of consideration, it being consequently assumed that the anode 17 of the diode 16 is connected through the resistor 24 to the control-grid of the tube 25, the part of the circuit described so far operates as follows:

It is assumed that no demodulated signal occurs in the resistor 3, that the tapping 11 occupies its top position and that the tube 25 is not operative. In this case the control grid of the tube 8 has no negative bias voltage, so that a high anode current and screen-grid current prevail and the potential of the cathode is high. Since the resistor 19 is connected to a point of still higher potential, the capacitor 18 is charged through the resistor 19 to the potential of the cathode of the tube 8, since the capacitor voltage cannot increase further owing to the presence of the diode 16.

The operation of the tube 25 is now considered. The voltage at the capacitor 18 causes a high anode current to be produced in the tube 25; this current produces a voltage drop across the parallel combination 9, 10. This voltage drop operates as a negative bias voltage for the control-grid of the tube 8, so that the anode current of this tube and hence the potential of the cathode decrease. Thus also the voltage at the capacitor 18 decreases and hence also the anode current of the tube 25. Consequently, the voltage drop across the parallel combination 9, 10 decreases, so that the bias voltage for the control-grid of the tube 8 becomes less negative and so on. In this manner a state of equilibrium is produced for the anode current of the tube 8.

The circuit is adjusted in a manner such that in the absence of a television signal the negative bias voltage across the parallel combination 9, 10 is so high that a minimum anode current flows through the tube 8. This condition is shown in Fig. 2*a*, in which the anode current $i_a$ of the tube 8 is plotted against the negative bias voltage $-V_g$.

For the sake of simplicity it is assumed that the tube characteristic curve is straight. In the absence of a television signal the negative bias voltage $V_9$ occurs across the parallel combination 9, 10.

Subsequent to demodulation, an incoming television signal produces a direct voltage across the resistor 3, which tends to decrease further the potential of the control-grid of the tube 8. Thus the anode current of the tube 8 and hence the potential of the cathode would decrease. Also the voltage across the capacitor 18 would decrease, and hence the current of the tube 25 would diminish, so that the voltage drop across the parallel combination becomes smaller. Owing to the direct-current negative feed-back phenomenon described, the negative voltage at the control-grid of the tube 8 remains substantially constant during the occurrence of the synchronizing pulses, if the amplitude of the demodulated television signal increases, since the voltage drop across the parallel combination 9, 10 then decreases.

This is shown in Figs. 2*b* and 2*c*, from which it is evident that in the case of an increase in amplitude of the television signals 28 and 29, the negative bias voltage $V_9$ decreases, and the peaks of the synchronizing pulses substantially coincide, as before, with the point of minimum anode current of the tube 8. Interference pulses 30 and 31 are thus limited in a simple manner to an amplitude exceeding only little that of the synchronizing pulses.

It should be noted that in Fig. 1 the tapping 11 does not occupy the top position, which, however, does not change the operation described above. The adjustable tapping 11 serves for contrast control of the television signals derived at 15 from the output circuit of the tube 8. Since the voltage supplied to the diode 16 is derived from the complete resistor 12 or, if desired, from a constant portion thereof, the contrast control does not affect the positions of the peaks of the synchronising pulses.

The resistor 13 has only for its object to aid the resistor 12, since a large part of the anode current may flow through the resistor 13, which may be of importance with respect to the choice of the material of which the resistor 12 is preferably made in view of the slidable tapping 11.

The circuit arrangement described so far is quite serviceable, as long as the number of the interferences and their duration are not excessively great.

For a better understanding of the difficulties arising, Fig. 3 shows the signal 32 occurring across the cathode resistor 12 as a function of time, the white in the signal exhibiting the largest amplitude. The black level lies at 33. The synchronising pulses, the peaks of which do not yet cut off the tube 8, as is evident from the explanation given with reference to Fig. 1, extend down to the level 35, which differs only little from the zero level. In the figure the frame synchronising pulses 34 are shown in black, since these pulses, have, as is known, a long duration and exhibit short interruptions only during this period; this can be indicated clearly only if a very long time axis is used. Between the levels 33 and 35 and in the time interval between two frame synchronizing pulses 34 a large number of line synchronizing pulses occur, which is indicated by cross-hatching. The interference signals 36 and 37 extend to the zero level, since they are limited by the cutting off point of the characteristic curves of the tube 8, shown in Fig. 2.

In Fig. 4, in which the parts corresponding to those shown in Fig. 3 are designated by the same reference numerals, is indicated the voltage occurring at the capacitor 18 subsequent to rectification by the diode 16. In the case of Fig. 4 it is assumed that the effective time constant of the network of capacitor 18 and resistor 19 is chosen to be sufficiently low, for example, about 5 to 20 line periods, as is desired for the circuit according to the invention. However, if the circuit according to the invention is not used, the time constant of the network 18, 19 must be higher, in order to supply an adequately smoothed direct voltage to the grid of the tube 25. In the case of a high time constant and if many interferences occur, the direct voltage at the capacitor will not be determined by the peaks of the synchronizing pulses, which would produce an amplitude corresponding to the level 35, but this direct voltage will, on the contrary, decrease considerably and differ only little from zero. Owing to the greater amplification in the direct current negative feed-back circuit, the grid voltage of the tube 8 will differ materially from the desired value.

If the circuit according to the invention is employed, however, the use of a low time constant is required, as stated above.

The voltage indicated in Fig. 4 is again rectified, however, by the rectifier 21 of opposite polarity and filtered by a network 22, 23 having a high time constant, for example, ten to a hundred times higher than the time constant of the network 18, 19.

Since the second rectifier 21 has opposite polarity, the rectified voltage occurring across the network 22, 23 is now substantially determined by the most positive portion of the voltage indicated in Fig. 4, i. e. by the level 38. Thus the direct voltage indicated in Fig. 5 is produced across the network 22, 23 the amplitude of this voltage differing by a constant value from the amplitude 35 determined by the peaks of the synchronizing pulses shown in Fig. 4. This constant value is equal to the voltage increase at the capacitor 18 in a time equal to the interval between two line synchronizing pulses. At the time of an interference only a very small ripple in the direct voltage obtained occurs owing to the high time constant of the network 22, 23.

It is thus ensured that even at the occurrence of many interference signals the peaks of the synchronizing pulses lie substantially at the cutting-off point of the characteristic curve of the tube 8. This permits the use of a method known per se of compensating or over-compensating the intereference signal, i. e. by adding interference pulses of opposite polarity and at least the same amplitude ("noise-inverter").

For this purpose the circuit shown in Fig. 1 comprises a tube 40, the cathode of which is connected to the cathode of the tube 8, the control-grid being connected to earth.

At the occurrence of a synchronizing pulse, the potential of the cathode of the tube 40 decreases and at the occurrence of a strong interference pulse this potential is decreased further. The cutting-off point of the characteristic curve of the tube 40 must be adjusted in a manner such that it substantially coincides with the potential occurring at the peak of a synchronizing pulse, this potential being, as is indicated above, substantially constant. At the occurrence of a synchronizing pulse the tube 40 does not yet become conductive. If the potential of the cathode of the tube 40 drops further, for example, when a strong interference pulse occurs, the tube becomes conductive, so that at the anode of the tube 40 occurs a voltage drop across the anode resistor, constituted by the resistor 14 in series with the resistor 41. On the other hand the occurrence of an interference signal produces a decrease in voltage at the control-grid of the tube 8, so that a voltage increase occurs in the anode circuit of the tube 8, i. e. across the resistor 14. A suitable proportioning of the resistors 14 and 41 ensures that the interference pulses are compensated or over-compensated at the anode of the tube 40. If the synchronizing signal for synchronizing deflection circuits is derived from this anode through a capacitor 42, the interference pulses are found in practice to exert substantially no influence on the synchronisation, even in the case of a strong interference pulse.

The correct position of the cutting-off point of the characteristic curve of tube 40 may be adjusted with the aid of a suitable screen-grid voltage, which may, for example, be about 25 v.

What is claimed is:

1. In a television receiver, a circuit-arrangement comprising a first electron discharge device having a control grid and signal output electrodes comprising an anode and a cathode, a source of demodulated television signals including a direct-current component and having synchronizing pulses of negative polarity, means connected to apply said signals to said control grid, a biasing resistor connected at an end thereof to said cathode, an impedance connected at an end thereof to said anode, a source of operating voltage connected between the remaining ends of said resistor and said impedance, a first rectifier having a cathode connected to said biasing resistor and having an anode, a source of positive-polarity voltage, a charging resistor connected between a terminal of said last-named voltage source and said last-named anode, a condenser connected between the remaining terminal of said last-named voltage source and said last-named anode thereby to be charged by said last-named voltage source through said charging resistor, said last-named voltage source having a value of voltage to bias said rectifier to be conductive for said signals whereby the charge on said condenser is caused to vary in accordance with said signals, said condenser and charging resistor having a time constant large enough to cause integration of said synchronizing pulses, a second rectifier having an anode connected to the anode of said first rectifier and having a cathode, means for biasing said second rectifier to cause it to be conductive for said varying charge on the condenser, an integrating circuit connected to said last-named cathode and having a time constant greater than the first-named time constant, a second electron discharge device having a control grid and an anode, means connected to feed signals from said integrating circuit to said last-named control grid, a source of operating voltage connected to said last-named anode, and direct-current conductive means connected between said last-named anode and the control grid of said first electron discharge device, the last-named operating voltage having a value to cause a suitable operative bias voltage to be applied to said control grid of the first electron discharge device to maintain the tips of said synchronizing pulses at the cut-off point of the characteristic curve of said first electron discharge device.

2. A circuit-arrangement, as set forth in claim 1, wherein the time constant of the network comprising said charging resistor and condenser is of the order of ten times the duration of a scanning line of said television signal and the time constant of said integrating circuit is about fifty times higher than that of said network.

3. A circuit-arrangement as set forth in claim 1, further including a third electron discharge device connected as an amplifier and having a signal input electrode and a signal output electrode, direct-current conductive means connected between said signal input electrode and the cathode of said first electron discharge device, means connected to bias said third device so as to amplify only noise signals having an amplitude level greater than the amplitude level of said synchronizing pulses, output circuit means connected to derive an output signal from the anode of said first discharge device, and means connected to feed the signal from the output electrode of said third discharge device to said output circuit means in phase opposition to said output signal.

4. A circuit-arrangement as set forth in claim 1, further including a third electron discharge device having a cathode, an anode and a control grid, means connected to bias said last-named control grid at a level such that said third device is conductive only for noise signals having an amplitude greater than that of said synchronizing pulses, a direct connection between said last-named cathode and the cathode of said first discharge device, and an output impedance connected in common to the anodes of said first and third discharge devices.

References Cited in the file of this patent

UNITED STATES PATENTS

| | | |
|---|---|---|
| 2,672,505 | Schwarz | Mar. 16, 1952 |
| 2,675,423 | Kirkness | Apr. 13, 1954 |